United States Patent
Alastair

(10) Patent No.: US 11,880,828 B2
(45) Date of Patent: Jan. 23, 2024

(54) DATA PROTECTION SYSTEM AND METHOD

(71) Applicant: Nuggets Limited, London (GB)

(72) Inventor: Johnson Alastair, London (GB)

(73) Assignee: Nuggets Limited, London (GB)

( * ) Notice: Subject to any disclaimer, the term of this patent is extended or adjusted under 35 U.S.C. 154(b) by 0 days.

(21) Appl. No.: 16/322,426

(22) PCT Filed: Aug. 1, 2017

(86) PCT No.: PCT/GB2017/052237
§ 371 (c)(1),
(2) Date: Jan. 31, 2019

(87) PCT Pub. No.: WO2018/025028
PCT Pub. Date: Feb. 8, 2018

(65) Prior Publication Data
US 2019/0197534 A1 Jun. 27, 2019

(30) Foreign Application Priority Data

Aug. 1, 2016 (GB) .................................. 1613233

(51) Int. Cl.
*G06Q 20/38* (2012.01)
*G06Q 20/42* (2012.01)
*H04L 9/32* (2006.01)

(52) U.S. Cl.
CPC ..... *G06Q 20/38215* (2013.01); *G06Q 20/425* (2013.01); *H04L 9/3218* (2013.01)

(58) Field of Classification Search
CPC ......... G06Q 20/38215; G06Q 20/3821; G06Q 20/425; H04L 9/0637; H04L 9/32; H04L 9/3218
(Continued)

(56) References Cited

U.S. PATENT DOCUMENTS 11,170,351 B1 * 11/2021 Kurani ................... G06Q 40/02
2014/0129830 A1 * 5/2014 Raudaschl .......... G06F 21/6218
713/165
(Continued)

FOREIGN PATENT DOCUMENTS

WO 2018025028 A1 2/2018

OTHER PUBLICATIONS

"Blockchain", Wikipedia, Retrieved from the Internet: URL:https://en.wikipedia.org/w/index.php?title=Blockchain&oldid=732399357 [retrieved on Oct. 30, 2017], 9 pgs.
(Continued)

*Primary Examiner* — Courtney P Jones
(74) *Attorney, Agent, or Firm* — Kwan & Olynick LLP

(57) ABSTRACT

A data protection system (10) and method are disclosed. The data protection system (10) includes a data repository (20), a data access interface (30) and an authentication system (40). The data repository (20) stores user data (25) for a user (50). The user data (25) comprises a plurality of individually encrypted components (25a-25e). The data access interface (30) is arranged to provide remote access to each of the individually encrypted components (25a-25e) in encrypted form. The data protection system (10) is arranged to provide selective access to each individual component in unencrypted form upon the authentication system authenticating the user for the respective component.

19 Claims, 3 Drawing Sheets

(58) Field of Classification Search
USPC .......................................................... 705/76
See application file for complete search history.

(56) References Cited

U.S. PATENT DOCUMENTS

| | | | |
|---|---|---|---|
| 2015/0128240 A1* | 5/2015 | Richards | H04W 12/0608 |
| | | | 726/7 |
| 2016/0105402 A1* | 4/2016 | Soon-Shiong | G06F 21/6245 |
| | | | 713/164 |
| 2016/0192166 A1 | 6/2016 | deCharms | |
| 2017/0177855 A1* | 6/2017 | Costa Faidella | H04L 9/3236 |
| 2017/0222814 A1* | 8/2017 | Oberhauser | G06Q 20/4014 |
| 2017/0230375 A1* | 8/2017 | Kurian | H04L 63/102 |
| 2017/0243209 A1* | 8/2017 | Johnsrud | H04L 12/14 |
| 2017/0243213 A1* | 8/2017 | Castinado | G06Q 20/38215 |
| 2017/0279801 A1* | 9/2017 | Andrade | H04L 63/08 |
| 2017/0286717 A1* | 10/2017 | Khi | G06F 21/6245 |
| 2017/0316390 A1* | 11/2017 | Smith | H04L 9/14 |
| 2017/0366348 A1* | 12/2017 | Weimer | H04L 9/3213 |
| 2018/0013562 A1* | 1/2018 | Haider | H04L 63/06 |
| 2018/0013567 A1* | 1/2018 | Davis | H04L 63/126 |
| 2018/0025140 A1* | 1/2018 | Edelman | G06F 21/316 |
| | | | 726/7 |
| 2018/0075527 A1* | 3/2018 | Nagla | G06Q 40/025 |
| 2018/0205537 A1* | 7/2018 | Wilson | G06Q 30/0601 |
| 2018/0285879 A1* | 10/2018 | Gadnis | G06F 16/1805 |
| 2018/0374097 A1* | 12/2018 | Hanna | H04L 63/123 |
| 2020/0186355 A1* | 6/2020 | Davies | H04L 9/3239 |

OTHER PUBLICATIONS

"International Application Serial No. PCT/GB2017/052237, Search Report and Written Opinion dated Nov. 13, 2017", 9 pgs.

Alastair, Johnson , "Data Protection System and Method", GB Application Serial No. 1613233.4, filed Aug. 1, 2016, 16 pgs.

* cited by examiner

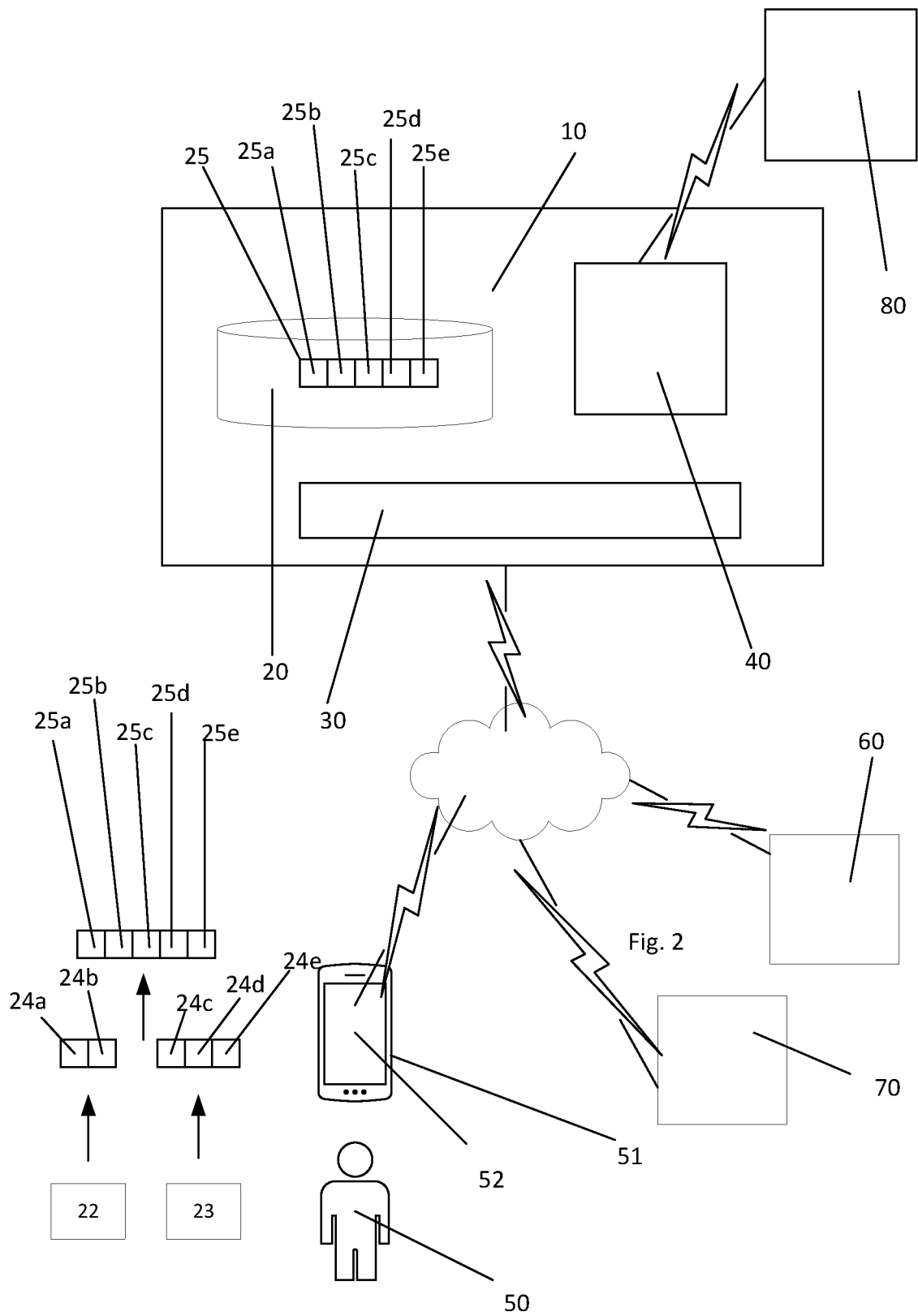

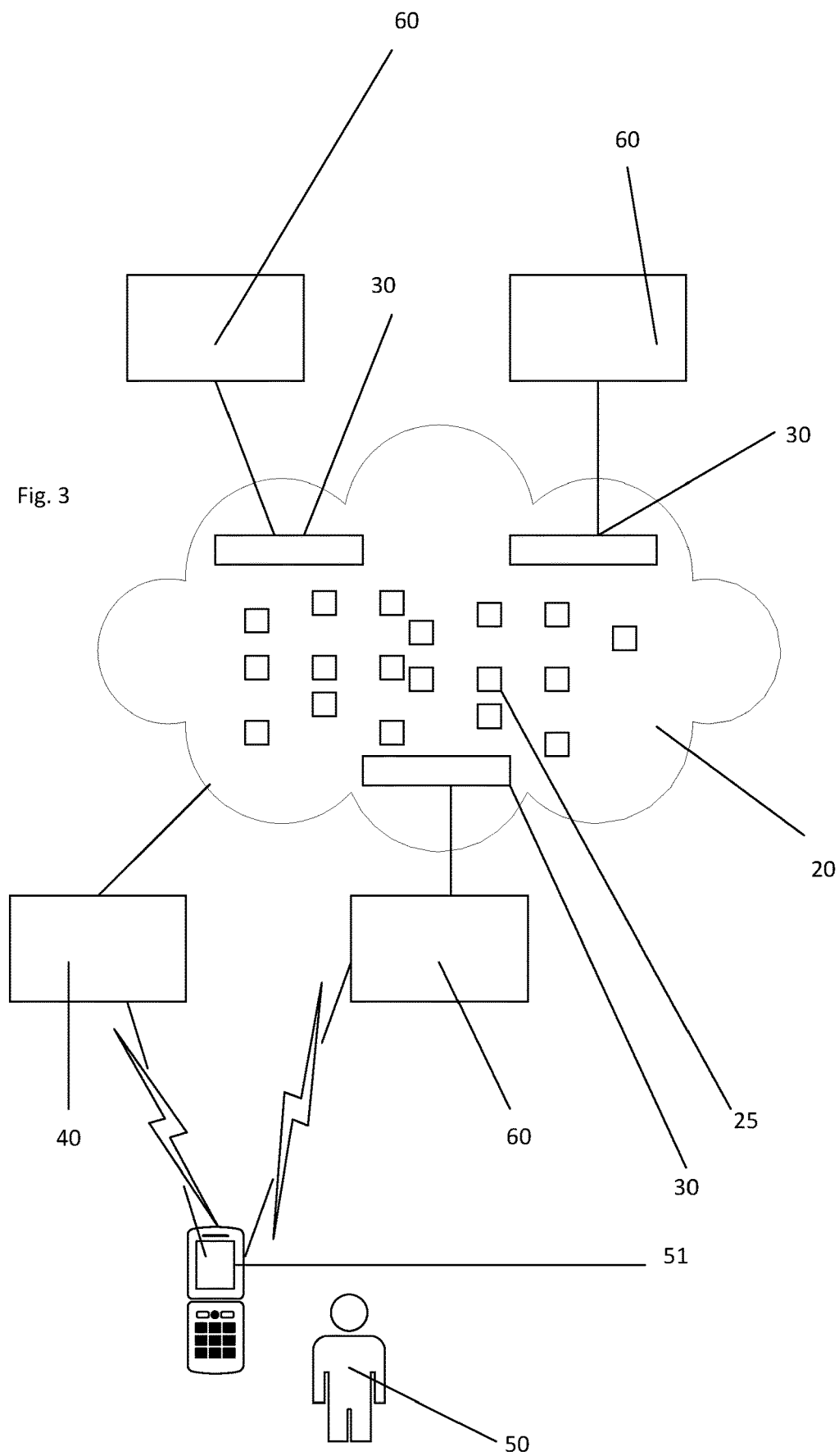

DATA PROTECTION SYSTEM AND METHOD

CROSS-REFERENCE TO RELATED APPLICATIONS

The present application is a U.S. national phase application of a PCT Application No. PCT/GB2017/052237 filed on Aug. 1, 2017, which claims priority of Great Britain Patent Application No. 1613233.4 filed in Great Britain on Aug. 1, 2016, the disclosure of which is incorporated herein in its entirety by reference.

FIELD OF THE INVENTION

The present invention relates to a data protection system and method that are particularly applicable for securing personal data.

BACKGROUND TO THE INVENTION

Storage and access to personal data is an ever-present problem. Data protection rules and regulations have been developed to regulate how a user's data may be stored and treated but that is only one small part of a complex problem.

Personal data is generally selectively disclosed by users and is often considered sensitive. Indeed, issues such as identity theft and credit card fraud all start from the acquisition of personal information. Personal data may, for example, include the name, address, date of birth of a user as well as information on employment, family or finances of a user.

If a user makes a purchase online, the online store would want the user's name, address, credit card number, credit card expiry date and potentially other authentication information such as the CVV code printed on the credit card. This information is then typically stored in the online store's database for later use in obtaining payment, fulfilling and shipping the order and ongoing aftersales support. If the online store's database is attacked and compromised, typically so too is the user's data that it stores.

This is a growing threat. In 2013, 40 million customers' financial information was exposed due to hacking of a major retailer. In 2014 a different retailer was hacked and 109 million customers' financial information was exposed. In 2015, the personal information of 80 million customers of another retailer was exposed due to hacking. Targets for hacking generally include credit card information, account information, address details and other personal information that might be used, for example, in identify theft. This is presently a significant concern to users.

While there exist mechanisms to deal with data breaches, they are inconvenient and far from perfect. If credit card information is exposed from hacking (or if the card is lost or stolen), a new credit card can be issued and the old one invalidated. However, it takes time for a new card to be issued and invalidation of the old card means that standing charges for subscriptions etc must be updated to reference the new credit card number. In the scheme of things, changing a credit card number that is stored somewhere is a relatively minor inconvenience. However, it is much more significant if it is a user's mobile phone number or email address that is compromised and must be changed.

STATEMENT OF THE INVENTION

According to an aspect of the present invention, there is provided a data protection system including a data repository, a data access interface and an authentication system, the data repository storing user data for a user, the user data comprising a plurality of individually encrypted components, the data access interface being arranged to provide remote access to each of the individually encrypted components in encrypted form, the data protection system being arranged to provide selective access to each individual component in unencrypted form upon the authentication system authenticating the user for the respective component.

In preferred embodiments, personal information is divided into a series of components, optionally with a wrapper, and encrypted and stored in a zero knowledge storage data repository. Preferably, the zero knowledge storage data repository uses blockchain to maintain a ledger of the stored encrypted information and store and verify changes to the stored information. Preferably, each component is a block in the blockchain.

Preferably, each of the individually encrypted components is encrypted by a zero knowledge protocol. The zero knowledge protocol may comprise a blockchain. The blockchain may include a distributed ledger verifying the encrypted components. The data protection system may be arranged to record changes to the encrypted components in the ledger. The data protection system may be arranged to record in the ledger data on transactions that use one or more of the encrypted components. For example, payment records for a transaction, item/services purchased, delivery and other information may be recorded.

Preferably, each individually encrypted component comprises a block in the blockchain.

The data protection system preferably further comprises a user interface executable by a user device, the user interface being arranged to receive authentication by the user for a transaction and to communicate authentication to the authentication system, the authentication system being arranged to provide the selective access for the components needed for the transaction. Preferably, the user interface is independent of merchant/service provider systems such that when a request is received from a merchant or service provider, the data protection system establishes a separate out-of-band communication with the user for authentication. Even if a user's account was compromised or spoofed, the request would still be notified to the user and data from the data protection system would not be released unless the request was authenticated out-of-band by the user.

The user device preferably includes a biometric reader configured to receive biometric authentication by a user, the data protection system being arranged to authenticate the user in dependence on the biometric authentication. In preferred embodiments, authentication uses biometric authentication—therefore even if an account was compromised and the user device that is used for out-of-band authentication was stolen, without biometric authentication the data protection system still would not release the data.

The data protection system may have a plurality of classes of component types and/or transaction types, at least one of said classes requiring a plurality of authentications to provide access to the components. For example, credit card numbers or important data such as social security or passport data may require multiple authentications in order for access to be permitted. The multiple authentications may be by the user or a combination of the user and others (such as credit card issuer or a user's designated proxy for authentication).

The data protection system may be arranged to provide selective access to each individual component in encrypted form upon the authentication system authenticating the user for the respective component.

According to an embodiment of the present invention, there is provided a computer implemented method for controlling access to data comprising:

storing user data for a user in a data repository as a plurality of individually encrypted components;

providing remote access to each of the individually encrypted components in encrypted form;

providing selective access to each individual component in unencrypted form upon authenticating the user for the respective component.

The step of storing may include storing each encrypted component as a block in a blockchain.

The step of storing may include dividing predetermined types of user data into a plurality of individually encrypted components.

The predetermined types may be selected from a set including include financial account information, address and date of birth.

Changes to the blockchain may be recorded in a distributed ledger verifying the encrypted components. The method may further comprise recording in the ledger data on transactions that use one or more of the encrypted components.

The method may further comprise:

notifying the user of a transaction requesting one or more of the individual components;

receiving authentication by the user for the transaction;

providing access to the one or more components upon receiving authentication.

The steps of notifying and receiving are preferably performed over a data communications channel that is out of band with regard to a data communications channel for the transaction.

The method may further comprise requiring increased authentication for at least selected types of individually encrypted components.

The increased authentication may comprise requiring multiple different authentications by the user.

The increased authentication may comprise requiring shared authentication by the user and another party.

According to another aspect of the present invention, there is provided a method of processing a transaction comprising:

receiving, from a transaction requester, a transaction request associated with a user, the transaction request identifying one or more data items that are stored as respective individually encrypted components;

communicating with a user interface associated with the user and requesting the user authenticates himself or herself to approve the transaction request;

receiving approval of the transaction request from the user; and, providing access to the identified one or more data items to the transaction requester.

The method may further comprise provided decrypted access to one or more of the identified data items.

The method may further comprise providing access to one or more of the identified data items in encrypted form, the one or more identified data items having been previously authenticated.

Examples/items of user data that may be stored include name, address and payment method information (for example in the case of a credit card the card number, expiry date and CVV code, for other payment mechanisms it may include other identifiers such as account and/or authentication information). Other user data may be stored such as identification data (such as data from an identity card, passport, driving license or other data). It will be appreciated that the type and volume of data stored may vary from user to user. Certain data may be mandatory and others may be optional. It will also be appreciated that the type of information stored may be variable yet be usable in the same way. For example, payment information could vary from user to user (one providing a bank account, another a credit card and another may provide multiple types of payment mechanisms). Not only could these be seamlessly handled to provide payment to a merchant (who can simply use an API to handle the information, they could also be changed without knowledge of the merchant to accommodate future payment mechanisms or when the user changes credit card supplier, for example.

User data may be subdivided into components. For example, an address could be subdivided into number, street, town, postcode etc. A date of birth could be subdivided into day, month and year. Financial account information (such as bank account, credit debit or charge card accounts, e-payment and other account/payment types) could be subdivided, not only into items such as identifier of financial provider, relevant dates, CVV codes etc but also to subdivide important numbers such as card/account number.

Subdivision could be performed corresponding to appropriate user interface fields (so D/M/Y of date of birth are presented separately so that they can be treated separately, likewise a credit card number may be divided into blocks of 4 digits). Alternatively or in other embodiments, subdivision could be automated or guided by Artificial Intelligence or pattern matching to pick out predetermined data types from user inputs.

User data could be input manually or it could be obtained from other data sources or it could be captured from physical documents such as passports, payment cards etc via a camera on a user device or similar. Preferably, know your client (KYC) and anti-money-laundering (AML) checks are performed when setting up a user—where data is being captured from physical documents such as those indicated above, KYC and AML may be made using the captured images of these documents. Preferably, data is captured from a photo ID and cross-checked against an image captured at registration time (for example, if registering via an app, a selfie could be taken using the device's camera and cross-checked against the photo ID to ensure the user is registering with his or her own ID).

An app for a smartphone or similar may be provided that provides all functionality for the user from on-boarding to capture user data for the data repository, KYC and AML, through to presenting transaction authorisation requests and obtaining user authentication, through to management of the user's data and (optionally) transaction records that are stored in the data repository.

Preferably, the app provides an out-of-band communication stream for notification and authentication to increase transaction security—for example:

a) a user initiates a transaction online at a website, for example on his PC.

b) the website operator (or his or her payment processor) contacts the data protection system to obtain data on the user and on the user's payment mechanism in order to complete the transaction.

c) the data protection system contacts the user via an app on his or her smartphone d) the user authenticates (preferably via biometric authentication) to approve the transaction e) the data protection releases the information to enable the website operator/payment processor to complete the transaction.

Note that steps a, b and e are independent of steps c and d. If the user was impersonated or his PC infected or otherwise subverted, he or she would still need to separately authenticate via the app in order to complete the transaction.

Preferably, the information may be decrypted in dependence on the user providing authentication, for example by biometric authentication. Optionally, a shared authentication mechanism may be used for certain components. In the case of shared authentication, both the user and some other body such as a credit card issuer, government or other trusted body may attest as to the veracity and validity of the authenticated component. For example, both the user and credit card issuer may sign each component for a credit card using a cryptographic signature or the like. The signature may not only attest to the correctness of the data but also to the value up to which the credit card may be used in a transaction. A merchant receiving a request for payment from the user which authorizes use of the components will be able to verify the signatures of the components and as a result know that the components can be relied upon for a transaction up to the value of the transaction.

The credit card issuers signature could at some point in the future be repudiated, for example if the card was reported lost or stolen or the card expired. Presence of multi-signatures on a component may be a requirement for certain transactions (such as credit card transactions) or it may be a system or merchant based requirement for transactions of certain type or value.

In preferred embodiments, the stored components are used with trusted services to transact. The transactions preferably use blockchain verification to ensure integrity of the stored components, other parties to the transaction (for example a retailer) and authenticity of the transaction. The data repository may act as a blockchain ledger for recording the transactions. Importantly, the components can be stored in a zero knowledge premise—the party doing the storing does not have or need the mechanism to decrypt the components. The user owns and controls their own data and how it's used.

In preferred embodiments, transactions may be processed without all components involved in the transaction being decrypted. For example, access to decrypted name and address related components may be provided but integrity of components concerning credit card related information may be sufficient as is discussed below.

Particular advantages of embodiments of the present invention include:

Information is preferably stored in a secure cloud blockchain that has preferably separate permissions for services so only the relevant permission is given to each item at the relevant time.

Preferably, information can only be accessed by you with multiple forms of biometric identification, multiple finger prints in unique combinations, facial recognition. These can be scaled according to requirements, maybe a thumb print to buy a coffee, thumb and finger or facial recognition for banking access.

Preferably, multi-form biometric access is required for at least the most sensitive of components—this prevents anyone other than the user accessing data, for example by using finger print sequencing and or other methods Preferably, Zero Knowledge Storage is used, meaning only the user has access to his or her information, to everyone else it is encrypted data.

The data repository is preferably independent and not tied to a particular bank, service, platform, brand or company.

As a result of independence of the data repository, preferably any approved service can call upon it.

Client side encryption may use SHA 256 in a secure blockchain validation, although other encryption protocols and mechanisms could also be used. The encryption of the blockchain uses KECCAK-256 (although it could use the NIST standardized SHA-3 hash function or some other function). Preferably, the data protection system also uses a private block chain that enables control of whom is allowed to operate a node on the block chain. All communications with the blockchain are also encrypted.

Preferably, each service is granted access to a component only as needed and on a time restricted basis. The components stay within the repository (for example within the distributed network that forms the blockchain ledger system) and preferably no local copy is stored by the service.

Preferably, components reside in the repository and are accessed via an API. A merchant or other party may be granted access to the components via the API but does not need, nor is provided with the opportunity to, store the data outside of the repository.

Preferably, data communications use TLS or SSL Transfers. Preferably, pre-encrypted files traveling to and from the data repository via a secure VPN tunnel. It will be appreciated that other transport mechanisms may be used.

As discussed above, preferred embodiments of the present invention utilize a blockchain ledger as part of the data repository. It will be appreciated that other ledger based systems or other encryption technologies could also be used.

A blockchain is a data structure that makes it possible to create a digital ledger of transactions and share it among a distributed network of computers. It uses cryptography to allow each participant on the network to manipulate the ledger in a secure way without the need for a central authority. When someone wants to add to the ledger, participants in the network—all of which have access to the existing blockchain—run algorithms to evaluate and verify the proposed transaction. If a majority of nodes agree that the transaction looks valid—that is, identifying information matches the blockchain's history—then the new transaction is approved and a new block added to the chain.

The term blockchain is used herein to describe a distributed ledger structure and distributed consensus process. There are different blockchain configurations that use different consensus mechanisms that are nevertheless "blockchain" for the purposes of this application.

While it is conventional for a blockchain ledger to be stored on publicly accessible systems, in selected embodiments of the present invention a private so-called "permissioned" blockchain whose network may be used where the network is made up only of known participants. It is also possible to use a private and public blockchain together, bridging from one to the other.

Each computer in a particular blockchain network is typically called a node. In its ideal state, each node has a copy of the entire ledger, similar to a local database, and works with other nodes to maintain the ledger's consistency. That creates fault tolerance, so if one node disappears or goes down, all is not lost. A network protocol governs how those nodes communicate with one another. In embodiments of the present invention, nodes may be separate to systems accessing the blockchain via APIs or they may in some cases combine the function of node and API so that a call via an API causes the node, at least in the first instance, to offer data from its copy of the ledger.

The blockchain nodes apply a consensus mechanism which is a set of rules used to verify each transaction and agree on the current state of the blockchain. For the bitcoin blockchain, the consensus mechanism is called proof of work, in which participants on the network run algorithms to confirm the digital signatures attached to blocks verify each transaction. In private or "permissioned" blockchain networks, the consensus mechanism may be less stringent since each participant is known. It will be appreciated that there are many types of blockchain system that will be suitable for use in implementing embodiments of the present invention.

In preferred embodiments, the blockchain may store more than the user's data. It may, for example, store data on transactions such that historic information can be evaluated and the user and/or merchant can be evaluated—for example are they a good "actor", has the merchant repeatedly not delivered or been in a dispute. Other information can also be associated with the transaction such as information on delivery mechanism—courier name and shipment identifier, proof of attempted delivery (photograph of delivery location or scanning of an electronically readable label or identifier for the delivery location for example), proof of acceptance of delivery (which may be via biometric authentication via the app for example).

BRIEF DESCRIPTION OF THE DRAWINGS

Embodiments of the present invention will now be described, by way of example only, with reference to the accompanying drawings in which:

FIG. 2 is a schematic diagram illustrating provision of user data to the data repository; and, FIG. 3 is a schematic diagram illustrating access of user data in the data repository.

DETAILED DESCRIPTION

Figure 1:
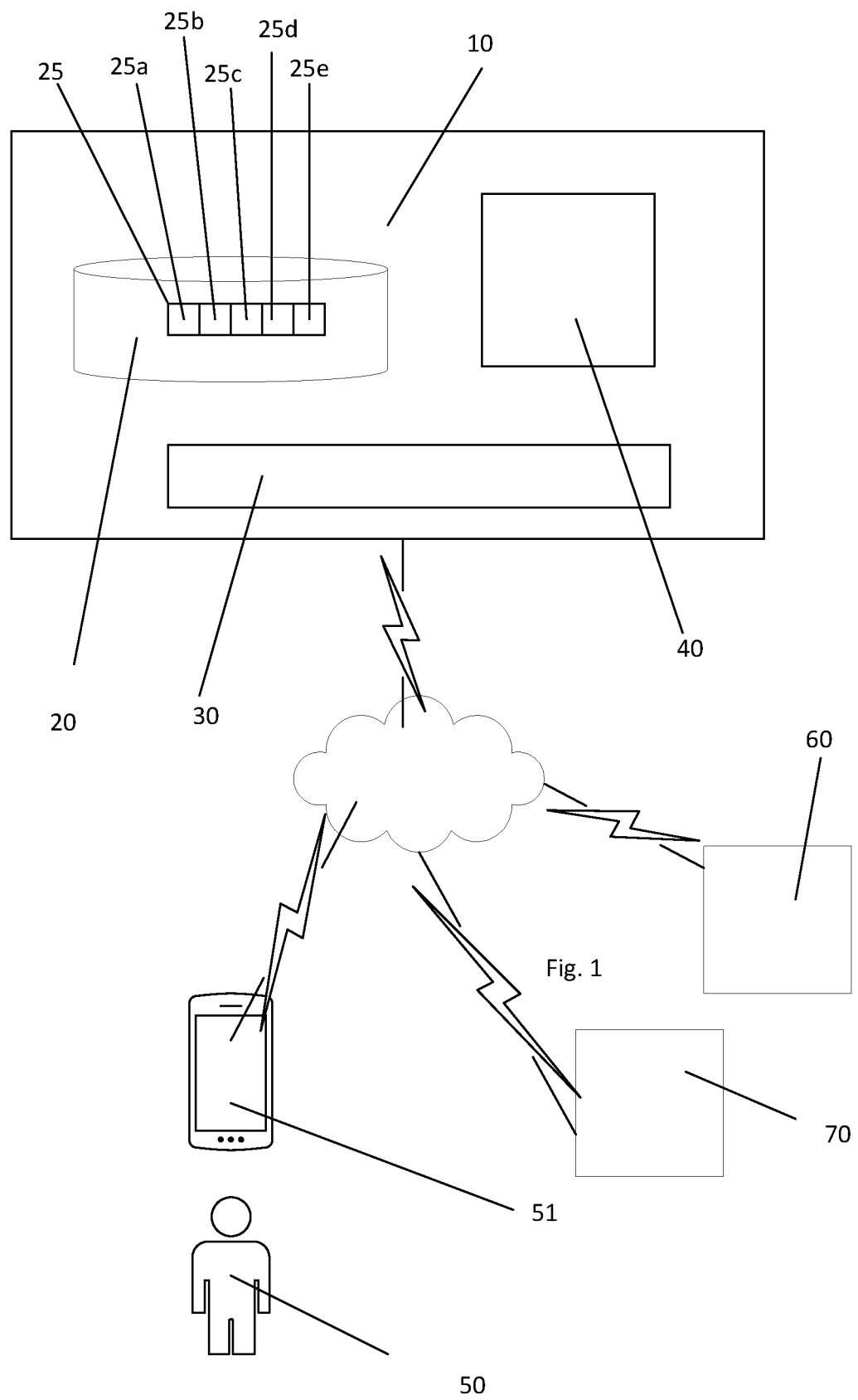
FIG. 1 is a schematic diagram of a data protection system according to an aspect of the present invention.

FIG. 1 is a schematic diagram of a data protection system according to an aspect of the present invention.

The data protection system 10 includes a data repository 20, a data access interface 30 and an authentication system 40.

The data repository 20 stores user data 25 for a user 50. The user data 25 comprises a plurality of individually encrypted components 25a-25e.

The data access interface 30 is arranged to provide remote access to each of the individually encrypted components 25a-25e in encrypted form to the user 50 and to remote systems 60, 70.

The user 50 preferably has a key such as a password or, preferably, a key that is provided by a system upon the user satisfying one or more biometric tests. The key allows access to the user's wallet and account. Each individually encrypted component has a private key and a public key. The private key is a secret code that is accessible via the user's wallet and which allows the user to prove his ownership of the component and enable access to it and control/edit it. The public key can be referenced by third parties for use in looking at the component but not revealing (decrypting) it. It will be appreciated that other key management schemes than wallets may also be used.

An example of how user data may be obtained and stored is discussed with reference to FIG. 2 below. The data protection system 10 is arranged to provide selective access to each individual component in unencrypted form, upon receiving appropriate authentication and/or approval from the user as described below with reference to FIG. 3. In certain situations, approval/authentication may also or alternatively be required from another party such as a financial services provider.

FIG. 2 is a schematic diagram illustrating provision of user data to the data repository of FIG. 1.

Each user is registered with the authentication system 40. The authentication system may be part of the system maintaining the repository (for example a blockchain system) or it may be an external system that interfaces between the user and the repository. Registration creates an account and associated authentication rules with the user. For example, multi-factor biometric authentication may be a prerequisite of the data protection system 10 in some embodiments and biometric information may be recorded at the authentication system 40 for later authentication. It will be appreciated that the authentication system 40 need not be responsible for the actual authentication which may be entrusted to one or more remote systems or $3^{rd}$ parties 80 with the authentication system 40 acting as an intermediary. In such an arrangement, the authentication system 40 would have details of the remote system that performs the authentication so as to ensure authentication requests are routed to the correct system and that responses correspond to the appropriate user and are not spoofed etc.

In operation, personal data 22, 23 for the user 50 is provided to a user device 51 via a user interface 52 (it will be appreciated that additionally or as an alternative the data may be captured or imported in another way). The user device segments the personal data 22, 23 into components 24a-24e. This may be done via dedicated input fields in the user interface mapping to components and/or algorithmically by dividing up inputs into components and/or some other way. The user device 51 then individually encrypts each component to produce encrypted components 25a-25e. Optionally, each encrypted component may have metadata associated with it, labelling the user as its owner and also optionally identifying the content type of the component. The encrypted components 25a-25e are communicated to the data repository 20 for storage. The individual components are preferably encrypted using a mechanism that enables the data protection system 10 in combination with the authentication system 40 to provide access to the components in unencrypted form. The encryption used may, for example, be asymmetric such as a public/private key mechanism.

For example, the user device 51 may hold an access key for the user 50. The access key is used to derive or create a private key and corresponding public key for each component created. During creation of the component, the public key is written to it. The public key allows the data access interface 30 (typically an API) to look at the component. The private key is retained by the user device 51 and enables the user device 51 to grant access and/or other rights to the component in unencrypted form in the future. It will be appreciated that the key information need not be stored on the user device 51—it could be stored elsewhere such as in a remote data store.

FIG. 3 is a schematic diagram illustrating access of user data in the data repository. FIG. 3 is a different visualization of the system of FIGS. 1 and 2. Here, multiple data access interfaces 30 (typically in the form of application programming interfaces, APIs) provide access to a decentralized repository 20. Components 25 are shown in the repository although, in practice, multiple blockchain nodes (not shown) will each be maintaining their own local copy of the ledger and the collection of nodes and their ledgers will make up the distributed repository.

Access to the user data is typically instigated by the user, although there are instances where it may be instigated by other parties as discussed below.

The purpose of using the data protection system described above is so that a user can directly or indirectly grant access to the stored user data under predefined circumstances. For example, a user 50 making a purchase on an ecommerce website may refer the ecommerce system 60 that operates the website to the user's personal data 25 held in the data repository 20 via an API 30. Rather than the user providing data that is stored (outside of the user's control) at the ecommerce system 60, the ecommerce system instead links to the data repository 20 and uses the user's personal data 25 there.

Upon the user wishing to use the data protection system 10 to provide information to a system/service 60, the user provides an identifier to the system/service 60 that enables the data protection system 10 to identify the user and his or her stored personal data 25. This information is communicated by the system/service 60 to the API 30 which in turn retrieves the relevant component(s) 25 from the repository 20. The API 30 may request components from a node in the repository 20 or it may itself be a node in the repository 20 and have its own local copy of the blockchain ledger. Typically, data requested by the system/service 60 will match one or more components that a user will have provided to the repository. In some circumstances, the API may need to map between the information requested and the components—for example a credit card number may be requested but this would typically be stored segmented into a number of components. Likewise, a system/service 60 may request a user's "name" but this may have been segmented into "first name" and "family name" components. The API preferably acts as an intermediary and bridges requests. Typically, the API will be hosted on or alongside the system/service 60.

The API need not necessarily request components from a node. Typically, the API will look to the blockchain for the information and there would be a managed blockchain based mechanism to retrieve data from the distributed data repository.

Preferably, at least selected components bear signatures of the user and another party, the other party providing assurance as to the content of the component. For example, multiple signatures may be used on credit card information with the card issuer signing to say it is valid at the current time and that an e-commerce site is ok to accept the payment on this basis.

The use of signatures in preferred embodiments means that the actual content of a component would not need to be revealed but a transaction could take place as the signatories confirm the validity of the component.

A user wanting to grant access to a component provides authentication to authentication system 40. Authentication will depend on the authentication mechanism(s) employed but preferably includes biometric authentication. In one embodiment, biometric data is provided via a user device such as the user device 51. The request for granting access may also include identification of the party to be granted access. Typically, the party will have pre-agreed to utilise the data protection system 10 and offer it as an alternate way of registering/paying for use of his or her services. For example, a dedicated button may be provided on a checkout page of the ecommerce system 60.

As discussed above, the user's personal data 25 is a divided series of components. Based on the user's interaction with the remote system 60, a session is established between the data protection system 10 and the remote system 60. This session is based on the user identifier.

In parallel to the session being established, the user is prompted by the authentication system 40 to provide authentication to enable the components requested by the remote system 60 to be accessed. Preferably, this is out of band and via an independent communication channel. For example, the transaction may be via the internet between a server and a user's PC. The out-of-band communication may be via a dedicated app on the user's phone (or to an app in a secure environment on the PC) or to some other device or system that is independent or can be operated in such a way that it is effectively secured and independent from interaction between the server and merchant.

Upon the authentication system 40 authenticating the user 50 for the respective component, the remote system 60 is granted access and the data protection system 10 is arranged to decrypt the component and provide access to the decrypted component for a predetermined period of time to the party.

Preferably, the information may be decrypted in dependence on the user providing authentication, form example by biometric authentication. Optionally, a shared authentication mechanism may be used for certain components. For example, both the user and credit card issuer may be able to grant access to components associated with a user's credit card—the user in order to authorize access to the components for use in making payments for a transaction, the credit card issuer for changing the information—for example to replace with a new card number on expiry or upon replacement of the card.

One way of controlling access to components is via what is known as smart contracts. A smart contract can have many different forms but in preferred embodiments would typically define who has rights to use or access components. They would typically have some time restriction associated with them. Smart contracts would typically be held somewhere remote of the API to allow simple updating. However, in some instances may be part of or referenced by the API. Smart contracts may be part of the repository. A smart contract may additionally specify limits such as time limit for access to stored components, which components may be accessed in unencrypted form, whether other parties may be granted access to components, amounts up to which payment mechanisms may be used etc. These limits may alternatively be enforced in other ways such as via restrictions in the API.

In preferred embodiments, the stored components may be used with trusted services to transact without decryption. The transactions use blockchain verification to ensure integrity of the stored components, other parties to the transaction (for example a retailer) and authenticity of the transaction. The data repository may optionally act as a blockchain ledger for recording the transactions. Importantly, the components can be stored in a zero knowledge premise—the party operating the data repository does not have or need the mechanism to decrypt the components. The user owns and controls their own data and how it is used.

Retailers may optionally be verified to the user via the system 10 based on data in the blockchain ledger. The system 10 may include verification of requests via APIs against data held on the requesting party. As the blockchain ledger will preferably grow to reflect activity and issues with transactions from both sides, verification may be used to ensure that a bad user cannot purchase something and a bad retailer cannot take a transaction.

In preferred embodiments, transactions may be processed without all components involved in the transaction being decrypted. For example, access to decrypted name and address related components may be provided but integrity of components concerning credit card related information may be sufficient. In such an arrangement, a credit card operator would accept payments with reference to authentication against the blockchain components—rather than causing the credit card information to be decrypted a user's authentication instead causes the transaction to be authorised and a request for payment to be relayed to the credit card operator with reference to the encrypted components. While the credit card operator may request decryption of the components, the operator may be satisfied simply with the authentication and process the transaction without ever needing the credit card information from the decrypted components.

It will be appreciated that the processing by reference to data in the repository mechanism discussed above also lends itself well to future systems or changes. If an address changes, the relevant components can be updated. If a new payment mechanism becomes available it can be substituted for that held in a component in the data repository—the ecommerce system etc still considers itself relying on authentic data, that data may simply have changed since the last transaction or since registration.

Optionally, the system includes a mechanism to allow use of one-time information. For example, email address, phone numbers, addresses (such as what3words) and communications or even credit card numbers could be created uniquely for each purchase so that the user does not need to disclose their actual email address or other information in the event it has to be revealed.

Upon request by a retailer for an email address or similar, a unique email address for the transaction would be supplied to the retailer. When the retailer uses this email to send purchase conformation, for example, it would be routed to the real email address by the system without disclosing the real email address. If the retailer was to then sell on the email address, it would be uniquely identifiable as being issued to the original retailer and this could be tagged on returned emails. It may also be included in the blockchain ledger. This could also be done for phone number, instant message address etc.

The content of GB 1613233.4 from which this application claims priority and of the abstract filed herewith are hereby incorporated by reference.

The invention claimed is:

1. A data protection system comprising:
a data repository storing user data for a user, the user data comprising a plurality of individually encrypted components, wherein each individually encrypted component includes associated metadata indicating an owner and a content type of the individually encrypted component, wherein the data repository is independent and not tied to a particular bank, service, platform, brand or company such that any approved service can call upon the data repository;
a data access interface configured to:
receive attestation of at least one of the individually encrypted components from a further party and record said attestation for the at least one individually encrypted component in the data repository,
receive a request for data for the user from a merchant or service provider system for a transaction, wherein the request requires an API to dynamically map, for the request, individually encrypted components of the user data to the data requested in the request for data for the user, the API being configured to act as an intermediary between different merchants and the data repository, and
upon receiving approval from the user, provide the merchant or service provider remote access to the mapped individually encrypted components in encrypted form; and
an authentication system configured to:
receive an authentication message from the user device approving access by the merchant or service provider to the requested user data, wherein the authentication message is received via an out-of-band communication with the user device that is separate and independent from communication with the merchant or service provider system,
determine if attestation is recorded in the data repository for each individually encrypted component corresponding to the request for user data; and
where no attestation is recorded, provide the merchant or service provider system with selective access to each individually encrypted component corresponding to the request for user data in unencrypted form for the transaction upon the authentication system authenticating the user for the respective component based on the authentication message and where attestation is recorded, provide the merchant or service provider system with the attestation instead of the user data in unencrypted form.

2. The data protection system of claim 1, wherein each of the individually encrypted components is encrypted by a zero knowledge protocol, the user via the authentication system having sole control of access to the user data in unencrypted form.

3. The data protection system of claim 2, wherein the zero knowledge protocol comprises a blockchain.

4. The data protection system of claim 3, wherein the blockchain includes a distributed ledger verifying the encrypted components.

5. The data protection system of claim 4, wherein the data protection system is arranged to record changes to the encrypted components in the ledger.

6. The data protection system of claim 3,
wherein the data protection system is arranged to record in the ledger data on transactions that use one or more of the encrypted components; and
wherein the authentication system is configured to verify the request received from the merchant or service provider system based on the ledger data prior to transmitting the authentication request to the user device.

7. The data protection system of claim 3, wherein each individually encrypted component comprises a block in the blockchain.

8. The data protection system of claim 1, wherein the authentication message includes biometric authentication by the user, wherein the authentication system is further configured to authenticate the user in dependence on the biometric authentication.

9. The data protection system of claim 8, wherein the data protection system has a plurality of classes of component types and/or transaction types, at least one of said classes requiring a plurality of authentications to provide access to the components.

10. The data protection system of claim 1, wherein increased authentication is required for individually encrypted components having a selected content type.

11. A computer implemented method for controlling access to data comprising:
   storing user data for a user in a data repository as a plurality of individually encrypted components, wherein each individually encrypted component includes associated metadata indicating an owner and a content type of the individually encrypted component, wherein the data repository is independent and not tied to a particular bank, service, platform, brand or company such that any approved service can call upon the data repository;
   via a data access interface,
      receiving attestation of at least one of the individually encrypted components from a further party and recording said attestation for the at least one individually encrypted component in the data repository
      receiving a request for data for the user from a merchant or service provider system for a transaction, wherein the request requires an API to dynamically map, for the request, individually encrypted components of the user data to the data requested in the request for data for the user, the API being configured to act as an intermediary between different merchants and the data repository,
      dynamically mapping, for the request, individually encrypted components of the user data that correspond to the request for data for the user, and
      upon receiving approval from the user, providing remote access to the merchant or service provider to the mapped individually encrypted components in encrypted form; and
   via an authentication system,
      receiving an authentication message from the user device approving access by the merchant or service provider to the requested user data, wherein the authentication message is received via an out-of-band communication with the user device that is separate and independent from communication with the merchant or service provider system, and
      determining if attestation is recorded in the data repository for each individually encrypted component corresponding to the request for user data; and
   where no attestation is recorded, providing the merchant or service provider system with selective access to each individually encrypted component corresponding to the request for user data in unencrypted form for the transaction upon authenticating the user for the respective component based on the authentication message and where attestation is recorded, providing the merchant or service provider system with the attestation instead of the user data in unencrypted form.

12. The method of claim 11, wherein storing user data for a user in the data repository includes storing each encrypted component as a block in a blockchain and dividing user data with predetermined content types into a plurality of individually encrypted components.

13. The method of claim 12, further comprising recording changes to the blockchain in a distributed ledger verifying the encrypted components.

14. The method of claim 11, wherein increased authentication is required for individually encrypted components having a selected content type.

15. The method of claim 14, wherein the increased authentication comprises requiring multiple different authentications by the user.

16. The method of claim 14, wherein the increased authentication comprises requiring shared authentication by the user and another party.

17. A data protection system comprising:
   a data repository storing user data for a user, the user data comprising a plurality of individually encrypted components, wherein each individually encrypted component includes associated metadata indicating an owner and a content type of the individually encrypted component, wherein the data repository is independent and not tied to a particular bank, service, platform, brand or company such that any approved service can call upon the data repository;
   a data access interface configured to:
      receive attestation of at least one of the individually encrypted components from a further party and record said attestation for the at least one individually encrypted component in the data repository,
      receive a request for data for the user from a merchant or service provider system for a transaction, wherein the request requires an API to dynamically map, for the request, individually encrypted components of the user data to the data requested in the request for data for the user, the API being configured to act as an intermediary between different merchants and the data repository, and
      upon receiving approval from the user, provide remote access, to the merchant or service provider, to the mapped individually encrypted components in encrypted form; and
   an authentication system configured to:
      receive an authentication message from the user device approving access by the merchant or service provider to the requested user data, wherein the authentication message is received via an out-of-band communication with the user device that is separate and independent from communication with the merchant or service provider system, and
      provide the merchant or service provider system with selective access to each individually encrypted component in unencrypted form for the transaction upon the authentication system authenticating the user for the respective component based on the authentication message,
   wherein the attestation comprises a cryptographic signature on the component by the further party attesting to the component, the cryptographic signature being verifiable by the merchant or service provider system, the cryptographic signature includes a value attestation up to which the component may be relied upon in a transaction.

18. The data protection system of claim 17, wherein the data protection system is configured to provide shared access to the user and the further party whereby both the user and the further party manage access to, and content of, one of the components in the data repository.

19. The data protection system of claim 17, wherein each of the individually encrypted components is encrypted by a zero knowledge protocol comprising a blockchain, the components being encrypted whereby the user has sole control of access in unencrypted form and wherein the user device is configured to enable decryption of the corresponding one of the individually encrypted components upon said provision of said selective access.

\* \* \* \* \*